(12) United States Patent
Coggio et al.

(10) Patent No.: US 7,267,850 B2
(45) Date of Patent: Sep. 11, 2007

(54) ARTICLE COMPRISING FLUOROCHEMICAL SURFACE LAYER

(75) Inventors: William D. Coggio, Hudson, WI (US); Thomas P. Klun, Lakeland, MN (US); Mark J. Pellerite, Woodbury, MN (US); George G. I. Moore, Afton, MN (US); Cheryl L. S. Eisbernd, Woodbury, MN (US); Sharon Wang, Saint Paul, MN (US); Richard S. Buckanin, Woodbury, MN (US); Christopher B. Walker, Jr., Saint Paul, MN (US); Naiyong Jing, Woodbury, MN (US); Zai-Ming Qiu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/458,408

(22) Filed: Jul. 19, 2006

(65) Prior Publication Data
US 2006/0251885 A1    Nov. 9, 2006

Related U.S. Application Data

(63) Continuation of application No. 10/841,159, filed on May 7, 2004, now Pat. No. 7,101,618.

(51) Int. Cl.
*B32B 5/16*  (2006.01)
*B32B 27/20* (2006.01)
*B32B 27/26* (2006.01)
*B32B 27/30* (2006.01)

(52) U.S. Cl. ............ 428/1.5; 428/323; 428/334; 428/336; 428/421; 428/522

(58) Field of Classification Search ........ 428/1.5, 428/336, 421, 522, 323, 334
See application file for complete search history.

(56) References Cited

U.S. PATENT DOCUMENTS

| 3,250,808 | A | 5/1966 | Moore, Jr. et al. |
| 3,472,894 | A | 10/1969 | Bartlett |
| 3,734,962 | A | 5/1973 | Niederprum |
| 4,262,072 | A | 4/1981 | Wendling et al. |
| 4,321,404 | A | 3/1982 | Williams et al. |
| 4,472,480 | A | 9/1984 | Olson |
| 4,567,073 | A | 1/1986 | Larson et al. |

(Continued)

FOREIGN PATENT DOCUMENTS

EP   0339880   12/1993

(Continued)

OTHER PUBLICATIONS

Bongiovanni et al., Macromol. Chem. Phys. 199, (1998) Perfluoropolyether Structures as Surface Modifying Agents of UV-Curable Systems, pp. 1099-1105.

(Continued)

*Primary Examiner*—Ramsey Zacharia
(74) *Attorney, Agent, or Firm*—Carolyn A. Fischer

(57) ABSTRACT

The invention relates to display and protective articles having a fluorochemical surface layer, and methods of making such articles. The invention also relates to fluoropolyether acrylate compositions.

28 Claims, 1 Drawing Sheet

U.S. PATENT DOCUMENTS

| | | | |
|---|---|---|---|
| 4,614,667 A | 9/1986 | Larson et al. | |
| 4,654,233 A | 3/1987 | Grant et al. | |
| 4,665,144 A | 5/1987 | Ohmori et al. | |
| 4,681,925 A | 7/1987 | Strepparola et al. | |
| 4,855,184 A | 8/1989 | Klun et al. | |
| 4,873,140 A | 10/1989 | McIntyre | |
| 4,968,116 A | 11/1990 | Hulme-Lowe et al. | |
| 4,985,473 A | 1/1991 | Williams et al. | |
| 5,002,978 A | 3/1991 | Goldenberg | |
| 5,008,534 A | 4/1991 | Yonezawa et al. | |
| 5,021,501 A | 6/1991 | Ohmori et al. | |
| 5,057,585 A | 10/1991 | Agou et al. | |
| 5,148,511 A | 9/1992 | Savu et al. | |
| 5,239,026 A | 8/1993 | Babirad et al. | |
| 5,302,316 A | 4/1994 | Hashimoto et al. | |
| 5,461,173 A | 10/1995 | Sato et al. | |
| 5,609,990 A | 3/1997 | Ha et al. | |
| 5,677,050 A | 10/1997 | Bilkadi et al. | |
| 5,948,478 A | 9/1999 | Lenti et al. | |
| 5,962,611 A | 10/1999 | Meijs et al. | |
| 6,127,498 A | 10/2000 | Tonelli et al. | |
| 6,150,024 A | 11/2000 | Dhoot et al. | |
| 6,224,949 B1 | 5/2001 | Wright et al. | |
| 6,238,798 B1 | 5/2001 | Kang et al. | |
| 6,376,572 B1 | 4/2002 | Turri | |
| 6,660,388 B2 | 12/2003 | Liu et al. | |
| 6,660,389 B2 | 12/2003 | Liu et al. | |
| 6,950,236 B2 | 9/2005 | Hokazono et al. | |
| 7,101,618 B2 * | 9/2006 | Coggio et al. | 428/336 |
| 2001/0033934 A1 | 10/2001 | Port et al. | |
| 2002/0001710 A1 | 1/2002 | Kang et al. | |
| 2002/0085284 A1 | 7/2002 | Nakamura et al. | |
| 2002/0111518 A1 | 8/2002 | Wang et al. | |
| 2002/0115820 A1 | 8/2002 | Wang et al. | |
| 2002/0122925 A1 | 9/2002 | Liu et al. | |
| 2003/0012936 A1 | 1/2003 | Draheim et al. | |
| 2003/0026997 A1 | 2/2003 | Qiu et al. | |
| 2003/0226818 A1 | 12/2003 | Dunbar et al. | |
| 2004/0077237 A1 | 4/2004 | Audenaert et al. | |
| 2004/0077238 A1 | 4/2004 | Audenaert et al. | |
| 2004/0077775 A1 | 4/2004 | Audenaert et al. | |
| 2004/0081764 A1 | 4/2004 | Liu et al. | |
| 2004/0124396 A1 | 7/2004 | Flynn et al. | |
| 2005/0106404 A1 | 5/2005 | Hayashida et al. | |
| 2005/0123741 A1 | 6/2005 | Hayashida et al. | |
| 2005/0136252 A1 | 6/2005 | Chisholm et al. | |
| 2005/0158504 A1 | 7/2005 | Itoh et al. | |
| 2005/0158558 A1 | 7/2005 | Hayashida et al. | |

FOREIGN PATENT DOCUMENTS

| | | |
|---|---|---|
| EP | 0433070 | 1/1996 |
| EP | 0479029 | 12/1997 |
| EP | 1057849 | 8/2003 |
| JP | 61-111308 | 5/1986 |
| JP | 5-209030 | 8/1993 |
| JP | 6-211945 | 2/1994 |
| JP | 10-241581 | 9/1998 |
| JP | 11-080312 | 3/1999 |
| JP | 11-329236 | 11/1999 |
| JP | 2000-301053 | 10/2000 |
| JP | 2001-035363 | 2/2001 |
| JP | 2002-6102 | 1/2002 |
| JP | 2002-036457 | 2/2002 |
| JP | 2002-332313 | 11/2002 |
| JP | 2003-315503 | 11/2003 |
| JP | 2004-083877 | 3/2004 |
| WO | WO92/21492 | 12/1992 |
| WO | WO 01/30873 | 5/2001 |
| WO | WO 02/066526 | 8/2002 |
| WO | WO 03/022906 | 3/2003 |
| WO | WO 03/099904 | 12/2003 |
| WO | WO 03/100157 | 12/2003 |
| WO | WO 03/100158 | 12/2003 |
| WO | WO 03/100159 | 12/2003 |
| WO | WO 04/002734 | 1/2004 |
| WO | WO 2004/060964 | 7/2004 |
| WO | WO 2005/049687 | 6/2005 |
| WO | WO 2005/061633 | 7/2005 |
| WO | WO 2005/111157 | 11/2005 |
| WO | WO 2005/113690 | 12/2005 |

OTHER PUBLICATIONS

Shacklette et al., Fluoropolymer 2002, Ultra-Low-Loss Polymers.
Bongiovanni et al., American Chemical Society.
International Search Report.

* cited by examiner

US 7,267,850 B2

ARTICLE COMPRISING FLUOROCHEMICAL SURFACE LAYER

RELATED APPLICATION DATA

This application is a continuation of application Ser. No. 10/841,159, filed May 7, 2004, now U.S. Pat. No. 7,101,618.

BACKGROUND

Optical displays typically have an exposed viewing surface made from a thermoplastic film or slab. Commonly employed thermoplastic polymers have very good optical transparency, dimensional stability and impact resistance, but unfortunately have poor abrasion resistance. The optical displays of devices such as personal digital assistants ("PDAs"), cell phones, liquid crystal display (LCD) panels, touch-sensitive screens and removable computer filters are subjected to frequent handling and contact with the user's face or fingers, styli, jewelry and other objects. For example, facial oils can adversely affect contrast, color saturation or brightness of a cell phone display. The screens of projection televisions and laptop computers are handled less frequently but nonetheless are susceptible to being touched, scratched or smudged. Consequently, the viewing face of the display is susceptible to scratches, abrasion and smudges arising during routine use. This can cause the display to lose resolution and clarity, and sometimes to become unreadable or inoperative. To protect such displays, protective films or coatings can be employed.

Hardcoats have also been used to protect the face of optical displays. These hardcoats typically contain inorganic oxide particles, e.g., silica, of nanometer dimensions dispersed in a binder precursor resin matrix, and sometimes are referred to as "ceramers".

U.S. Pat. No. 6,132,861 (Kang et al. '861); U.S. Pat. No. 6,238,798 B1 (Kang et al. '798); U.S. Pat. No. 6,245,833 B1 (Kang et al. '833); U.S. Pat. No. 6,299,799 (Craig et al.) and Published PCT Application No. WO 99/57185 (Huang et al.) describes ceramer compositions containing blends of colloidal inorganic oxide particles, a curable binder precursor and certain fluorochemical compounds. These compositions are described as providing stain and abrasion resistant hardcoats in a single layer coating.

U.S. Pat. No. 6,660,389 (Liu et al.) describes information display protectors for display devices having an information display area, comprising a stack of flexible substantially transparent sheets, the sheets having on one side thereof an adhesive layer and having on the other side thereof a hardcoat layer comprising inorganic oxide particles dispersed in a binder matrix and a low surface energy fluorinated compound, the stack being cut so that the sheets will fit the information display area. The low surface energy fluorinated compound can be part of the hardcoat layer or can be a separate layer atop the hardcoat layer. The protectors have very good scratch, smudge and glare resistance. The stack of protectors can be stored, for example, on a personal digital assistant or its cover or case.

JP 2000-301053 describes a hardcoat sheet and its production. The composition is composed of an alkyl fluoroacrylate A, an acrylic monomer B incompatible with A and containing at least 10% of an acrylic monomer having greater than or equal to three functional groups, an acrylic monomer C incompatible with A and containing at least 50% hydrophilic acrylic monomer and a solvent D compatible respectively with A, B and C.

WO 2004/002734 describes an object having a hard coating excellent in antifouling properties, lubricity, marring resistance, and wearing resistance; and a method of forming a hard coating. A hard coating material composition containing an actinic-energy-ray-curable compound is applied to a surface of an object (1) to be coated with a hard coating layer to thereby form a layer of the hard coating material composition. A film of a surface material comprising a fluorinated polyfunctional (meth)acrylate compound and a fluorinated monofunctional (meth)acrylate compound is formed on the layer of the hard coating material composition to form a layer of the surface material. The layer of the hard coating material composition and the surface material layer thus formed are irradiated with actinic energy rays to simultaneously cure both layers. Thus, a hard coating layer (2) in contact with the surface of the object (1) and an antifouling surface layer (3) in contact with the surface of the hard coating layer (2) are formed.

Although various surface coatings for optical displays have been described, industry would find advantage in new compositions that impart a synergistic combination of surface properties.

SUMMARY

In one embodiment, the invention relates to an article suitable for use as a protective article on a display panel comprising:
a) a light transmissive substrate having a surface layer comprising the reaction product of
  i) at least one fluoropolyether (meth)acryl compound, and
  ii) at least one non-fluorinated crosslinking agent; and
b) a hardcoat layer disposed between the substrate and the surface layer.

The substrate is typically a transparent or matte polymeric film. The article may include an adhesive layer, typically on the opposing surface of the substrate as the hardcoat layer.

In another embodiment, the invention relates to an article (e.g. display panel) comprising a surface layer comprising the reaction product of at least one fluoropolyether (meth) acryl compound, and at least one non-fluorinated crosslinking agent; and a hardcoat layer disposed between the substrate and the surface layer.

In each of these embodiments, the surface layer preferably exhibits a low surface energy as indicated by a static contact angle with water of at least 90° and/or an advancing contact angle with hexadecane of at least 50°. The surface layer preferably has a thickness ranging from about 10 to 200 nanometers. The surface layer preferably exhibits an initial haze of less than 2% and/or an initial transmission of at least 90%. In addition, the surface layer is preferably durable as indicated by sustainability of its properties (i.e. contact angle, ink repellency, ink bead up, haze, transmission) after durability testing.

In another embodiment, the invention relates to a coating composition comprising at least one fluoropolyether (meth) acryl compound, at least one non-fluorinated crosslinking agent, and hydrocarbon solvent. The coating composition may further comprise a photoinitiator. The coating composition is preferably free of fluorinated solvents.

In another embodiment, the invention relates to a method of providing a surface layer on a substrate by applying such coating composition.

In another embodiment, the invention relates to a composition comprising the reaction product of:
a) at least one compound having the formula $(R_A)$—W—$(CH_2R^{F1}$—H) wherein $R_A$ is a (meth)acrylate group or a $CH_2=CFCO$ group, $R^{F1}$ is a fluoroalkylene group comprising 2 to 7 carbon atoms, and W is a linking group;
b) at least one fluoropolyether acrylate compound; and
c) at least one crosslinking agent having at least two (meth)acrylate groups.

For each of these embodiments, the fluoropolyether compound typically comprises a perfluorinated moiety. The (per)fluoropolyether acrylate compound may comprise a single mono functional (per)fluoropolyether acrylate, a single polyfunctional (per)fluoropolyether acrylate, or any combination thereof.

DETAILED DESCRIPTION OF THE PREFERRED EMBODIMENTS

Figure 1:
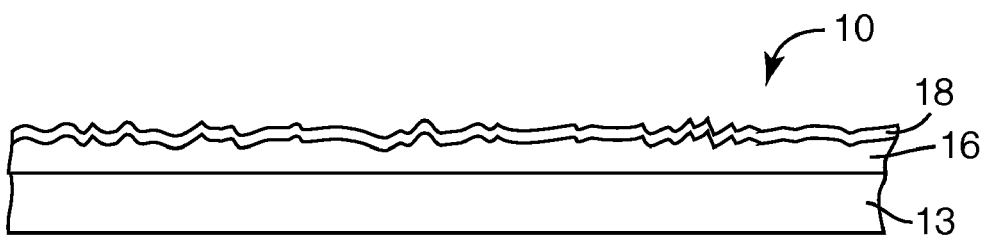
FIG. 1 is a cross-sectional view of an illustrative display of the invention.

The invention relates to display and protective articles having a fluorochemical surface layer and methods of making such articles. The articles comprise a (e.g. light transmissive) substrate and a hardcoat layer disposed between the substrate and the surface layer. The invention also relates to certain fluorochemical compositions.

The fluorochemical surface layer comprises the reaction product of at least one fluoropolyether (meth)acryl compound and at least one crosslinking agent. The fluoropolyether (meth)acryl compound preferably comprises a perfluorinated moiety. As used herein (per)fluoropolyether refers to a fluoropolyether that is optionally perfluorinated.

As used herein "(per)fluoropolyether (meth)acryl compound" refers to a compound comprising at least one (per)fluoropolyether group and at least one (meth)acryl group typically joined by a linking group. Preferably, the (meth)acryl group is a (meth)acrylate group optionally substituted with hydrogen or fluorine. In at least some embodiments, acrylate groups are preferred. As used herein, (meth)acryl groups includes those class of compounds such as (meth)acrylate esters, (meth)acrylamides, and N-alkyl (meth)acrylamides, optionally substituted with hydrogen or fluorine. Preferably, the (meth)acryl group is a (meth)acrylate group optionally substituted with hydrogen or fluorine. In at least some embodiments, acrylate groups are preferred.

"Crosslinking agent" and "crosslinker" are used herein interchangeably and refer to a monomer or oligomer having at least two (meth)acryl groups. Preferably, the crosslinker comprises at least two (meth)acrylate groups and thus is a poly(meth)acrylate compound. In at least some embodiments, acrylate groups are preferred.

As used herein "wt-%" refers to weight percent solids based on the coating composition or reaction product thereof unless specified otherwise.

The kind and amount of crosslinking agent is chosen to provide the desired durability of the surface coating. The crosslinking agent is preferably non-fluorinated. The Applicant has found that (per)fluoropolyether (meth)acryl compounds exhibit improved compatibility with non-fluorinated crosslinking agents resulting in optically clear cured surface layers being substantially free of (e.g. visible) surface defects. In contrast, compositions comprising incompatible ingredients can compromise the optical quality (e.g. higher haze or lower transmission) and/or can be less durable The reaction product of the composition described herein contributes a synergistic combination of low surface energy as imparted by the (per)fluoropolyether (meth)acryl compound in combination with good durability, as imparted by the hydrocarbon crosslinking agent. The underlying hardcoat also contribute to the durability.

The surface energy can be characterized by various methods such as contact angle and ink repellency, as determined according to the test methods described in the examples. The surface layer and articles described herein preferably exhibits a static contact angle with water of at least 70°. More preferably the contact angle with water is at least 80° and even more preferably at least 90° (e.g. at least 95°, at least 100°). Alternatively or in addition thereto, the advancing contact angle with hexadecane is at least 50° and more preferably at least 60°. Low surface energy is indicative of anti-soiling properties as well as the surface being easy to clean. As yet another indication of low surface energy, ink from a marker commercially available under the trade designation "Sanford Sharpie, Fine Point permanent marker, no 30001" preferably beads up. Further, the surface layer and articles described herein exhibit "ink repellency", meaning that the ink can easily be removed by wiping with a tissue commercially available from Kimberly Clark Corporation, Roswell, Ga. under the trade designation "SURPASS FACIAL TISSUE".

The composition described herein is typically free of hydrophilic ingredients (e.g. monomers) since the inclusion of such tends to reduce anti-soiling properties as well as stain certain media (e.g. substrates). Hydrophilic components are also susceptible to degradation upon exposure to aqueous based cleaning agents.

The surface layer and articles described herein are also preferably durable, meaning that the surface exhibits substantially no surface damage or significant loss of optical properties (e.g. retains 97% of its original transmission) after durability testing conducted according to the test method described in the examples wherein cheesecloth is employed with a 725 g weight and 200 wipes. Further, the surface layer and articles preferably continues to exhibit the previously described low surface energy properties (e.g. contact angles, ink repellency, and bead up) even after such durability testing.

The presently described surface layer does not detract from the optical qualities of the article (e.g. display). Accordingly, the articles of the invention exhibit substantially the same initial haze and transmission values in comparison to the same substrate or hardcoat coated substrate lacking such surface layer as described herein. Preferably the haze and transmission values are substantially the same after durability testing.

Although as little as 5 wt-% crosslinker may result in suitable durability for some applications, it is typically preferred to maximize the concentration of crosslinker particularly since non-fluorinated (meth)acrylate crosslinkers are generally less expensive than fluorinated compounds. Accordingly, the coating compositions described herein typically comprise at least 20 wt-% crosslinking agent(s). The total amount of crosslinking agent(s) may comprise at least 50 wt-% and may be for example at least 60 wt-%, at least 70 wt-%, at least 80 wt-%, at least 90 wt-% and even about 95 wt-% of the coating composition.

Useful crosslinking agents include, for example, poly(meth)acryl monomers selected from the group consisting of (a) di(meth)acryl containing compounds such as 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated (10) bisphenol A diacrylate, ethoxylated (3) bisphenol A diacrylate, ethoxylated (30) bisphenol A diacrylate, ethoxylated (4) bisphenol A diacrylate, hydroxypivalaldehyde modified trimethylolpropane diacrylate, neopentyl glycol diacrylate, polyethylene glycol (200) diacrylate, polyethylene glycol (400) diacrylate, polyethylene glycol (600) diacrylate, propoxylated neopentyl glycol diacrylate, tetraethylene glycol diacrylate, tricyclodecanedimethanol diacrylate, triethylene glycol diacrylate, tripropylene glycol diacrylate; (b) tri(meth)acryl containing compounds such as glycerol triacrylate, trimethylolpropane triacrylate, ethoxylated triacrylates (e.g., ethoxylated (3) trimethylolpropane triacrylate, ethoxylated (6) trimethylolpropane triacrylate, ethoxylated (9) trimethylolpropane triacrylate, ethoxylated (20) trimethylolpropane triacrylate), pentaerythritol triacrylate, propoxylated triacrylates (e.g., propoxylated (3) glyceryl triacrylate, propoxylated (5.5) glyceryl triacrylate, propoxylated (3) trimethylolpropane triacrylate, propoxylated (6) trimethylolpropane triacrylate), trimethylolpropane triacrylate, tris(2-hydroxyethyl)isocyanurate triacrylate; (c) higher functionality (meth)acryl containing compounds such as ditrimethylolpropane tetraacrylate, dipentaerythritol pentaacrylate, ethoxylated (4) pentaerythritol tetraacrylate, pentaerythritol tetraacrylate, caprolactone modified dipentaerythritol hexaacrylate; (d) oligomeric (meth)acryl compounds such as, for example, urethane acrylates, polyester acrylates, epoxy acrylates; polyacrylamide analogues of the foregoing; and combinations thereof. Such compounds are widely available from vendors such as, for example, Sartomer Company, Exton, Pa.; UCB Chemicals Corporation, Smyrna, Ga.; and Aldrich Chemical Company, Milwaukee, Wis. Additional useful (meth)acrylate materials include hydantoin moiety-containing poly(meth)acrylates, for example, as described in U.S. Pat. No. 4,262,072 (Wendling et al.).

A preferred crosslinking agent comprises at least three (meth)acrylate functional groups. Preferred commercially available crosslinking agent include those available from Sartomer Company, Exton, Pa. such as trimethylolpropane triacrylate available under the trade designation "SR351", pentaerythritol triacrylate available under the trade designation "SR444", dipentaerythritol pentaacrylate available under the trade designation "SR399LV", ethoxylated (3) trimethylolpropane triacrylate available under the trade designation "SR454", and ethoxylated (4) pentaerythritol triacrylate, available under the trade designation "SR494".

The coating composition described herein may comprise various combinations of monofunctional (per)fluoropolyether compound(s), combinations of polyfunctional (per)fluoropolyether compounds, as well as compositions the comprise one or more monofunctional (per)fluoropolyether compound(s) in combination with one or more polyfunctional (per)fluoropolyether compounds.

The total amount of (per)fluoropolyether (meth)acryl compound in the coating composition that is polymerized to form the surface layer is typically at least 0.5 wt-% (e.g. at least about 1 wt-%, 2 wt-%, 3 wt-%, and 4 wt-%). Preferably, the coating composition comprises at least about 5 wt-% (per)fluoropolyether (meth)acryl compounds. Particularly for embodiments that employ polyfunctional (per)fluoropolyether (meth)acryl compounds, the coating composition may contain as much as 95 wt-% (per)fluoropolyether (meth)acryl compounds. However, as previously described, it is generally more cost effective to employ a minimal concentration of (per)fluoropolyether (meth)acryl compound(s) that provide the desired low surface energy. Accordingly, the total amount of (per)fluoropolyether (meth)acryl compound(s) provided in the coating composition typically does not exceed 30 wt-% and preferably is present is an amount of no more than about 15 wt-% (e.g. less than about 14 wt-%, 13 wt-%, 12 wt-%, and 11 wt-%)

A variety of (per)fluoropolyether (meth)acryl compounds may be employed in the coating compositions of the invention. Perfluoropolyether (meth)acryl compounds can be represented by the following Formula I:

wherein $R_f$ is (per)fluoropolyether group; W is a linking group; and $R_A$ is a (meth)acryl group or —COCF=CH$_2$; and w is 1 or 2.

The perfluoropolyether group $R_f$ can be linear, branched, cyclic, or combinations thereof and can be saturated or unsaturated. The perfluoropolyether has at least two catenated oxygen heteroatoms. Exemplary perfluoropolyethers include, but are not limited to, those that have perfluorinated repeating units selected from the group of —($C_pF_{2p}$)—, —($C_pF_{2p}$O)—, —(CF(Z))—, —(CF(Z)O)—, —(CF(Z)$C_pF_{2p}$O)—, —($C_pF_{2p}$CF(Z)O)—, —(CF$_2$CF(Z)O)—, or combinations thereof. In these repeating units, p is typically an integer of 1 to 10. In some embodiments, p is an integer of 1 to 8, 1 to 6, 1 to 4, or 1 to 3. The group Z is a perfluoroalkyl group, perfluoroether group, perfluoropolyether, or a perfluoroalkoxy group, all of which can be linear, branched, or cyclic. The Z group typically has no more than 12 carbon atoms, no more than 10 carbon atoms, or no more than 9 carbon atoms, no more than 4 carbon atoms, no more than 3 carbon atoms, no more than 2 carbon atoms, or no more than 1 carbon atom. In some embodiments, the Z group can have no more than 4, no more than 3, no more than 2, no more than 1, or no oxygen atoms. In these perfluoropolyether structures, the different repeat units can be distributed randomly along the chain.

$R_f$ can be monovalent or divalent. In some compounds where $R_f$ is monovalent, the terminal groups can be ($C_pF_{2p+1}$)—, ($C_pF_{2p+1}$O)—, (X'$C_pF_{2p}$O)—, or (X'$C_pF_{2p+1}$)— where X' is hydrogen, chlorine, or bromine and p is an integer of 1 to 10. In some embodiments of monovalent $R_f$ groups, the terminal group is perfluorinated and p is an integer of 1 to 10, 1 to 8, 1 to 6, 1 to 4, or 1 to 3. Exemplary monovalent $R_f$ groups include CF$_3$O (C$_2$F$_4$O) $_n$CF$_2$—, and C$_3$F$_7$O(CF(CF$_3$)CF$_2$O)$_n$CF(CF$_3$)— wherein n has an average value of 0 to 50, 1 to 50, 3 to 30, 3 to 15, or 3 to 10.

Suitable structures for divalent $R_f$ groups include, but are not limited to, —CF$_2$O(CF$_2$O)$_q$(C$_2$F$_4$O)$_n$CF$_2$—, —(CF$_2$)$_3$O (C$_4$F$_8$O)$_n$(CF$_2$)$_3$—, —CF$_2$O(C$_2$F$_4$O)$_n$CF$_2$—, and —CF(CF$_3$)(OCF$_2$CF(CF$_3$))$_2$OC$_tF_{2t}$O(CF(CF$_3$)CF$_2$O)$_n$CF(CF$_3$)—, wherein q has an average value of 0 to 50, 1 to 50, 3 to 30, 3 to 15, or 3 to 10; n has an average value of 0 to 50, 3 to 30, 3 to 15, or 3 to 10; s has an average value of 0 to 50, 1 to 50, 3 to 30, 3 to 15, or 3 to 10; the sum (n+s) has an average value of 0 to 50 or 4 to 40; the sum (q+n) is greater than 0; and t is an integer of 2 to 6.

As synthesized, compounds according to Formula I typically include a mixture of $R_f$ groups. The average structure is the structure averaged over the mixture components. The values of q, n, and s in these average structures can vary, as long as the compound has a number average molecular weight of at least about 400. Compounds of Formula I often have a molecular weight (number average) of 400 to 5000, 800 to 4000, or 1000 to 3000.

The linking group W between the perfluoropolyether segment and (meth)acryl or —COCF═CH$_2$ endgroup includes a divalent group selected from an alkylene, arylene, heteroalkylene, or combinations thereof and an optional divalent group selected from carbonyl, carbonyloxy, carbonylimino, sulfonamido, or combinations thereof. W can be unsubstituted or substituted with an alkyl, aryl, halo, or combinations thereof. The W group typically has no more than 30 carbon atoms. In some compounds, the W group has no more than 20 carbon atoms, no more than 10 carbon atoms, no more than 6 carbon atoms, or no more than 4 carbon atoms. For example, W can be an alkylene, an alkylene substituted with an aryl group, or an alkylene in combination with an arylene.

The perfluoropolyether acrylate compounds (e.g. of Formula I) can be synthesized by known techniques such as described in U.S. Pat. Nos. 3,553,179 and 3,544,537 as well as U.S. Patent Application Publication No. 2004/0077775 "Fluorochemical Composition Comprising a Fluorinated polymer and Treatment of a Fibrous Substrate Therewith".

Alternatively or in addition to at least one monofunctional (per)fluoropolyether acrylate compound, the (per)fluoropolyether acrylate compound may be polyfunctional, having two or more (meth)acryl groups such as (meth)acrylate groups.

One type of preferred polyfunctional perfluoropolyether acrylate compounds comprises at least one terminal F(CF(CF$_3$)CF$_2$O)aCF(CF$_3$)— group wherein a averages 4 to 15. Such compounds are further described in U.S. Provisional Application Ser. No. 60/569351, titled "Fluoropropyleneoxide Polyacrylate Compositions", filed on the same day as the present application; incorporated herein by reference. In some embodiments, the polyfunctional perfluoropolyether acrylates comprises a terminal HFPO— group. As used herein "HFPO—" refers to the structure F(CF(CF$_3$)CF$_2$O) aCF(CF$_3$)— wherein a averages 6 to 7 (e.g. 6.3). Exemplary compounds include for example

HFPO—C(O)N(H)C(CH$_2$OC(O)CH═CH$_2$)$_2$CH$_2$CH$_3$, and

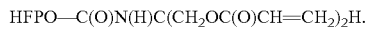

HFPO—C(O)N(H)C(CH$_2$OC(O)CH═CH$_2$)$_2$H.

The perfluoropolyther acrylate comprising at least one terminal HFPO— group and at least two (meth)acryl groups can be prepared in a two step process. The first step is by reaction of poly(hexafluoropropylene oxide) esters, such as HFPO—C(O)OCH$_3$ or acid halides HFPO—C(O)F, with materials containing at least 3 alcohol or primary or secondary amino groups to produce HFPO— amide polyols or polyamines, HFPO— ester polyols or polyamines, or HFPO— amides, or HFPO— esters with mixed amine and alcohol groups. The second is (meth)acrylation of the alcohol and/or amine groups with (meth)acryloyl halides, (meth)acrylic anhydrides or (meth)acrylic acid. Exemplary syntheses thereof are set forth in the examples.

In other embodiments, the (per)fluoropolyether acrylate compound may be a compound preparable by Michael-type addition of a reactive (per)fluoropolyether with a poly(meth)acrylate, such as the adduct of HFPO—C(O)N(H)CH$_2$CH$_2$CH$_2$N(H)CH$_3$ with trimethylolpropane triacrylate (TMPTA). Such (per)fluoropolyether acrylate compounds are further described in U.S. patent application Ser. No. 10/841792, "Polymerizable Compositions, Methods of Making the Same, and Composite Articles Therefrom", filed on the same day as the present application; incorporated herein by reference.

The coating composition described herein may comprise a monofunctional fluorinated compound that can be represented by the following Formula II:

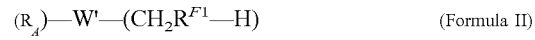

(R$_A$)—W'—(CH$_2$R$^{F1}$—H)         (Formula II)

wherein R$_A$ is as previously described (i.e. a (meth)acrylate or a CH$_2$═CFCO group); R$^{F1}$ is a fluoroalkylene group comprising 2 to 7 carbon atoms; and W' is a linking group.

R$_A$ of Formula II is preferably an acrylate group. R$^{F1}$ may be a linear or branched perfluorinated alkylene moiety.

The monofunctional fluorinated compounds of Formula II can be synthesized by known techniques. An exemplary monofunctional fluorinated compound of Formula II, ω-hydro 2,2,3,3,4,4,5,5-octafluoropentyl acrylate (H—C$_4$F$_8$—CH$_2$O—C(O)—CH═CH$_2$), is commercially available from Oakwood Products, West Columbia, S.C. Monofunctional fluorinated compounds of Formula II having the formula H(CF$_2$)nCH$_2$OCOCH═CH$_2$ where n=2, 4, and 6 as well as CF$_3$CHFCF$_2$CH$_2$OCOC(CH$_3$)CH$_2$ (2,2,3,4,4,4 hexafluorobutyl methacrylate) are commercially available from Lancaster Chemical, Windham, N.H.

The inclusion of one or more monofunctional fluorinated compounds of Formula II can further improve the compatibility of at least certain perfluoropolyether acrylate compounds with the poly(meth)acrylate crosslinking agents. This aspect is particularly advantageous for embodiments wherein a monofunctional perfluoropolyether acrylate compound is employed such HFPO—C(O)N(H)CH$_2$CH$_2$OC(O)CH═CH$_2$.

The amount of monofunctional fluorinated compound(s) of Formula II utilized in the coating composition of the invention can vary depending on the kind and amount of (per)fluoropolyether acrylate compound employed. Typically, the amount ranges from about half the amount of the (per)fluoropolyether acrylate compound to about twice the amount of the (per)fluoropolyether acrylate compound.

The coating composition described herein may further various other reactive and non-reactive ingredients. For example the composition may comprise polymerizable (meth)acryl compounds with alkyl, perfluoroalkyl, and perfluoroalkylene moieties. Examples of these compounds include butyl acrylate, 1H,1H-2,2,3,3,4,4,4-heptafluorobutyl acrylate, available from Sigma-Aldrich; 1H,1H,2H,2H-perfluorodecyl acrylate, available from Lancaster Synthesis, Windham, N.H.; and C$_4$F$_9$SO$_2$N(CH$_3$)CH$_2$CH$_2$OC(O)CH═CH$_2$ made by the procedure of Examples 2A and 2B of WO01/30873A. Numerous other (meth)acryl compounds with perfluoroalkyl moieties are mentioned in U.S. Pat. No. 4,968,116 and in U.S. Pat. No. 5,239,026 (including (perfluorocyclohexyl)methyl acrylate).

To facilitate curing, polymerizable compositions according to the present invention may further comprise at least one free-radical thermal initiator and/or photoinitiator. Typically, if such an initiator and/or photoinitiator are present, it comprises less than about 10 percent by weight, more typically less than about 5 percent of the polymerizable composition, based on the total weight of the polymerizable composition. Free-radical curing techniques are well known in the art and include, for example, thermal curing methods as well as radiation curing methods such as electron beam or ultraviolet radiation. Further details concerning free radical thermal and photopolymerization techniques may be found in, for example, U.S. Pat. No. 4,654,233 (Grant et al.); U.S. Pat. No. 4,855,184 (Klun et al.); and U.S. Pat. No. 6,224,949 (Wright et al.).

Useful free-radical thermal initiators include, for example, azo, peroxide, persulfate, and redox initiators, and combinations thereof.

Useful free-radical photoinitiators include, for example, those known as useful in the UV cure of acrylate polymers. Such initiators include benzophenone and its derivatives; benzoin, alpha-methylbenzoin, alpha-phenylbenzoin, alpha-allylbenzoin, alpha-benzylbenzoin; benzoin ethers such as benzil dimethyl ketal (commercially available under the trade designation "IRGACURE 651" from Ciba Specialty Chemicals Corporation of Tarrytown, N.Y.), benzoin methyl ether, benzoin ethyl ether, benzoin n-butyl ether; acetophenone and its derivatives such as 2-hydroxy-2-methyl-1-phenyl-1-propanone (commercially available under the trade designation "DAROCUR 1173" from Ciba Specialty Chemicals Corporation) and 1-hydroxycyclohexyl phenyl ketone (commercially available under the trade designation "IRGACURE 184", also from Ciba Specialty Chemicals Corporation); 2-methyl-1-[4-(methylthio)phenyl]-2-(4-morpholinyl)-1-propanone commercially available under the trade designation "IRGACURE 907", also from Ciba Specialty Chemicals Corporation); 2-benzyl-2- (dimethylamino)-1-[4-(4-morpholinyl)phenyl]- 1-butanone commercially available under the trade designation "IRGACURE 369" from Ciba Specialty Chemicals Corporation); aromatic ketones such as benzophenone and its derivatives and anthraquinone and its derivatives; onium salts such as diazonium salts, iodonium salts, sulfonium salts; titanium complexes such as, for example, that which is commercially available under the trade designation "CGI 784DC", also from Ciba Specialty Chemicals Corporation); halomethylnitrobenzenes; and mono- and bis-acylphosphines such as those available from Ciba Specialty Chemicals Corporation under the trade designations "IRGACURE 1700", "IRGACURE 1800", "IRGACURE 1850", "IRGACURE 819" "IRGACURE 2005", "IRGACURE 2010", "IRGACURE 2020" and "DAROCUR 4265". Combinations of two or more photoinitiators may be used. Further, sensitizers such as 2-isopropyl thioxanthone, commercially available from First Chemical Corporation, Pascagoula, M.S., may be used in conjunction with photoinitiator(s) such as "IRGACURE 369".

Those skilled in the art appreciate that the coating compositions can contain other optional adjuvants, such as, surfactants, antistatic agents (e.g., conductive polymers), leveling agents, photosensitizers, ultraviolet ("UV") absorbers, stabilizers, antioxidants, lubricants, pigments, dyes, plasticizers, suspending agents and the like.

The coating composition of the invention is preferably applied as a separate surface layer using a solvent that assists in coating of the composition of the invention onto the hardcoat. Those skilled in the art will appreciate that selection of a desired solvent and solvent level will depend on the substrate or surface being coated, the ingredients of the coating composition, and on the coating conditions. Although fluorinated solvents could optionally be employed alone or in combination with an organic solvent, the (per) fluoropolyether acrylate(s) and crosslinking agent are generally sufficiently soluble in non-fluorinated solvent. Thus, the coating composition can advantageously be free of fluorinated solvents. Preferred solvents include ketones such as methyl ethyl ketone (MEK), methyl isobutylene ketone (MIBK), and methyl propyl ketone (MPK); and acetates such as ethyl acetate, at a concentration to obtain the intended coating thickness (e.g. 2% to 3% solids). Any adjuvants, as previously described, are typically added after dissolution with the solvent.

The coating composition can be applied to the hardcoat using a variety of conventional coating methods. Suitable coating methods include, for example, spin coating, knife coating, die coating, wire coating, flood coating, padding, spraying, roll coating, dipping, brushing, foam application, and the like. The coating is dried, typically using a forced air oven. The dried coating is at least partially and typically completely cured using an energy source.

Preferred energy sources include ultraviolet light curing devices that provide a UV "C" dosage of about 5 to 60 millijoules per square centimeter ($mJ/cm^2$). Preferably curing takes place in an environment containing low amounts of oxygen, e.g., less than about 100 parts per million. Nitrogen gas is a preferred environment.

Preferably the coating composition is applied at a sufficient amount to provide a cured layer having a thickness of at least about 10 nanometers, and preferably at least about 25 nanometers. Typically, the cured layer has a thickness of less than about 200 nanometers, preferably less than about 100 nanometers, and more preferably less than about 75 nanometers. Accordingly, the bulk of the durability is provided by the underlying hardcoat layer.

As depicted in FIG. 1, the reaction product of the composition described herein 18 is disposed on the viewing surface of (e.g. display) article 10. A hardcoat layer 16 is disposed between (e.g. transparent) substrate 13 and the surface layer 18. Although other layers may also be present, the hardcoat is beneath (i.e. relative to the viewing surface) the surface layer. The hardcoat is a tough, abrasion resistant layer that protects the substrate and the underlying display screen from damage from causes such as scratches, abrasion and solvents. However, the hardcoat alone does not provide the desired low surface energy. Although the surface layer is preferably substantially free of inorganic oxide particles, the hardcoat preferably contains such nanometer-sized inorganic oxide particles dispersed in a binder matrix. The hardcoat is typically free of fluorinated compounds, yet may optionally contain a fluorinated compound as desired. Typically the hardcoat is formed by coating a curable liquid ceramer composition onto the substrate and curing the composition in situ to form a hardened film. Suitable coating methods include those previously described for application of the fluorochemical surface layer. Further details concerning hardcoats can be found in U.S. Pat. No. 6,132,861 (Kang et al. '861), U.S. Pat. No. 6,238,798 B1 (Kang et al. '798), U.S. Pat. No. 6,245,833 B1 (Kang et al. '833) and U.S. Pat. No. 6,299,799 (Craig et al. '799); incorporated herein by reference.

As an alternative to providing the coating of the invention as a surface layer on an article or surface such as could be done during the manufacture of the display panel, the coating composition of the invention may be employed as a (e.g. surface) layer on a protective article.

Figure 2:
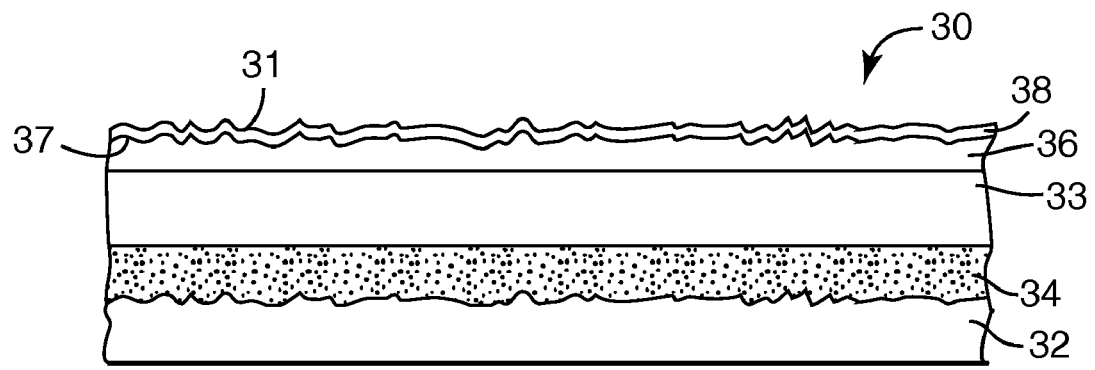
FIG. 2 is a cross-sectional view of an illustrative protective article of the invention.

FIG. 2 shows a protective article suitable for application to a display of the invention generally identified as 30. The lower face of flexible membrane 33 is coated with an adhesive layer 34 to which has been applied a protective liner 32. The lower surface of adhesive 34 may optionally be microtextured as depicted. Microtexturing helps air bubbles escape from beneath information display protector 30 when it is applied to a display screen, thereby helping to provide good optical coupling between information display protector 30 and the screen. The upper face of membrane 33 is coated with a hardcoat layer 36. Hardcoat 36 provides scratch and abrasion resistance to help protect the screen from damage. Hardcoat 36 optionally has a roughened upper surface 37 as depicted. A roughened surface provides glare protection for a display screen and makes it easier to write upon the display screen using a stylus. The coating composition 38 of the invention is typically sufficiently thin so that the roughened upper surface 37 of hardcoat 36 is replicated on viewing surface 31. Further information on such display protectors is described in U.S. Pat. No. 6,660,389; incorporated herein by reference.

Various permanent and removable grade adhesive compositions may be coated on the opposite side of the substrate (i.e. to that of the hardcoat) so the article can be easily mounted to a display surface. Suitable adhesive compositions include (e.g. hydrogenated) block copolymers such as those commercially available from Kraton Polymers, Westhollow, Tex. under the trade designation "Kraton G-1657", as well as other (e.g. similar) thermoplastic rubbers. Other exemplary adhesives include acrylic-based, urethane-based, silicone-based and epoxy-based adhesives. Preferred adhesives are of sufficient optical quality and light stability such that the adhesive does not yellow with time or upon weather exposure so as to degrade the viewing quality of the optical display. The adhesive can be applied using a variety of known coating techniques such as transfer coating, knife coating, spin coating, die coating and the like. Exemplary adhesive are described in U.S. Patent Application Publication No. 2003/0012936. Several of such adhesives are commercially available from 3M Company, St. Paul, Minn. under the trade designations 8141, 8142, and 8161.

A variety of substrates can be utilized in the articles of the invention. Suitable substrate materials include glass as well as thermosetting or thermoplastic polymers such as polycarbonate, poly(meth)acrylate (e.g., polymethyl methacrylate or "PMMA"), polyolefins (e.g., polypropylene or "PP"), polyurethane, polyesters (e.g., polyethylene terephthalate or "PET"), polyamides, polyimides, phenolic resins, cellulose diacetate, cellulose triacetate, polystyrene, styrene-acrylonitrile copolymers, epoxies, and the like. Typically the substrate will be chosen based in part on the desired optical and mechanical properties for the intended use. Such mechanical properties typically will include flexibility, dimensional stability and impact resistance. The substrate thickness typically also will depend on the intended use. For most applications, substrate thicknesses of less than about 0.5 mm are preferred, and more preferably about 0.02 to about 0.2 mm. Self-supporting polymeric films are preferred. Films made from polyesters such as PET or polyolefins such as PP (polypropylene), PE (polyethylene) and PVC (polyvinyl chloride) are particularly preferred. The polymeric material can be formed into a film using conventional filmmaking techniques such as by extrusion and optional uniaxial or biaxial orientation of the extruded film. The substrate can be treated to improve adhesion between the substrate and the hardcoat layer, e.g., chemical treatment, corona treatment such as air or nitrogen corona, plasma, flame, or actinic radiation. If desired, an optional tie layer or primer can be applied to the substrate and/or hardcoat layer to increase the interlayer adhesion.

In the case of articles such as display panels and protective articles, the substrate is light transmissive, meaning light can be transmitted through the substrate such that the display can be viewed. Both transparent (e.g. gloss) and matte light transmissive substrates are employed in display panels. Matte substrates typically have lower transmission and higher haze values than typical gloss films. The matte films exhibit this property typically due to the presence of micron size dispersed inorganic fillers such as silica that diffuse light. Exemplary matte films are commercially available from U.S.A. Kimoto Tech, Cedartown, Ga. under the trade designation "N4D2A". In case of transparent substrates, hardcoat coated transparent substrates, as well as the display articles comprised of transparent substrates, the haze value is preferably less than 5%, more preferably less than 2% and even more preferably less than 1%. Alternatively or in addition thereto, the transmission is preferably greater than about 90%.

A variety of inorganic oxide particles can be used in the hardcoat. The particles are typically substantially spherical in shape and relatively uniform in size. The particles can have a substantially monodisperse size distribution or a polymodal distribution obtained by blending two or more substantially monodisperse distributions. The inorganic oxide particles are typically non-aggregated (substantially discrete), as aggregation can result in precipitation of the inorganic oxide particles or gelation of the hardcoat. The inorganic oxide particles are typically colloidal in size, having an average particle diameter of about 0.001 to about 0.2 micrometers, less than about 0.05 micrometers, and less than about 0.03 micrometers. These size ranges facilitate dispersion of the inorganic oxide particles into the binder resin and provide ceramers with desirable surface properties and optical clarity. The average particle size of the inorganic oxide particles can be measured using transmission electron microscopy to count the number of inorganic oxide particles of a given diameter. Inorganic oxide particles include colloidal silica, colloidal titania, colloidal alumina, colloidal zirconia, colloidal vanadia, colloidal chromia, colloidal iron oxide, colloidal antimony oxide, colloidal tin oxide, and mixtures thereof. The inorganic oxide particles can consist essentially of or consist of a single oxide such as silica, or can comprise a combination of oxides, such as silica and aluminum oxide, or a core of an oxide of one type (or a core of a material other than a metal oxide) on which is deposited an oxide of another type. Silica is a common inorganic particle. The inorganic oxide particles are often provided in the form of a sol containing a colloidal dispersion of inorganic oxide particles in liquid media. The sol can be prepared using a variety of techniques and in a variety of forms including hydrosols (where water serves as the liquid medium), organosols (where organic liquids so serve), and mixed sols (where the liquid medium contains both water and an organic liquid), e.g., as described in U.S. Pat. No. 5,648,407 (Goetz et al.); U.S. Pat. No. 5,677,050 (Bilkadi et al.) and U.S. Pat. No. 6,299,799 (Craig et al.), the disclosure of which is incorporated by reference herein. Aqueous sols (e.g. of amorphous silica) can be employed. Sols generally contain at least 2 wt-%, at least 10 wt-%, at least 15 wt-%, at least 25 wt-%, and often at least 35 wt-% colloidal inorganic oxide particles based on the total weight of the sol. The amount of colloidal inorganic oxide particle is typically no more than 50 wt-% (e.g. 45 wt-%). The surface of the inorganic particles can be "acrylate functionalized" as described in Bilkadi et al. The sols can also be matched to the pH of the binder, and can contain counterions or water-soluble compounds (e.g., sodium aluminate), all as described in Kang et al. '798.

The hardcoat can conveniently be prepared by mixing an aqueous sol of inorganic oxide particles with a free-radically curable binder precursor (e.g., one or more free-radically curable monomers, oligomers or polymers that can participate in a crosslinking reaction upon exposure to a suitable source of curing energy). The resulting composition usually is dried before it is applied, in order to remove substantially all of the water. This drying step is sometimes referred to as "stripping". An organic solvent can be added to the resulting ceramer composition before it is applied, in order to impart improved viscosity characteristics and assist in coating the ceramer composition onto the substrate. After coating, the ceramer composition can be dried to remove any added solvent, and then can be at least partially hardened by exposing the dried composition to a suitable source of energy in order to bring about at least partial cure of the free-radically curable binder precursor.

A variety of binders can be employed in the hardcoat. The binder is derived from a free-radically polymerizable precursor that can be photocured once the hardcoat composition has been coated upon the substrate. Binder precursors such as the protic group-substituted esters or amides of an acrylic acid described in '799, or the ethylenically-unsaturated monomers described in '799 et al., are often preferred. Suitable binder precursors include polyacrylic acid or polymethacrylic acid esters of polyhydric alcohols, such as diacrylate or di(meth)acrylate esters of diols including ethyleneglycol, triethyleneglycol, 2,2-dimethyl-1,3-propanediol, 1,3-cyclopentanediol, 1-ethoxy-2,3-propanediol, 2-methyl-2,4-pentanediol, 1,4-cyclohexanediol, 1,6-hexamethylenediol, 1,2-cyclohexanediol, 1,6-cyclohexanedimethanol, resorcinol, pyrocatechol, bisphenol A, and bis(2-hydroxyethyl) phthalate; triacrylic acid or trimethacrylic acid esters of triols including glycerin, 1,2,3-propanetrimethanol, 1,2,4-butanetriol, 1,2,5-pentanetriol, 1,3,6,-hexanetriol, 1,5,10-decanetriol, pyrogallol, phloroglucinol, and 2-phenyl-2,2-methylolethanol; tetraacrylic acid or tetramethacrylic acid esters of tetraols including 1,2,3,4-butanetetrol, 1,1,2,2,-tetramethylolethane, 1,1,3,3,-tetramethylolpropane, and pentaerythritol tetraacrylate; pentaacrylic acid or pentamethacrylic acid esters of pentols including adonitol; hexaacrylic acid or hexamethacrylic acid esters of hexanols including sorbitol, dipentaerythritol, dihydroxy ethyl hydantoin; and mixtures thereof. The binder can also be derived from one or more monofunctional monomers as described in Kang et al. '798. The binder comprises one or more N,N-disubstituted acrylamide and or N-substituted-N-vinyl-amide monomers as described in Bilkadi et al. The hardcoat may be derived from a ceramer composition containing about 20 to about 80% ethylenically unsaturated monomers and about 5 to about 40% N,N-disubstituted acrylamide monomer or N-substituted-N-vinyl-amide monomer, based on the total weight of the solids in the ceramer composition.

The inorganic particles, binder and any other ingredients in the hardcoat are chosen so that the cured hardcoat has a refractive index close to that of the substrate. This can help reduce the likelihood of Moire patterns or other visible interference fringes.

As mentioned above, the hardcoat can be formed from an aqueous coating composition that is stripped to remove water prior to coating, and optionally diluted with a solvent to assist in coating the composition. Those skilled in the art will appreciate that selection of a desired solvent and solvent level will depend on the nature of the individual ingredients in the hardcoat and on the desired substrate and coating conditions. Kang et al. '798 describes several useful solvents, solvent levels and coating viscosities.

The hardcoat can be crosslinked with various agents to increase the internal cohesive strength or durability of the hardcoat. Typical crosslinking agents have a relatively large number of available functional groups, and include tri and tetra-acrylates, such as pentaerythritol triacrylate and pentaerythritol tetraacrylate. When used, the crosslinking agent is often less than about 60 parts, such as about 30 to about 50 parts by weight per 100 parts by weight of the binder.

If the hardcoat is prepared by combining an aqueous sol of colloidal inorganic oxide particles with the binder precursor, then the sol has a pH such that the particles have a negative surface charge. For example, if the inorganic particles are predominantly silica particles, the sol is alkaline with a pH greater than 7, greater than 8, or greater than 9. The sol may include ammonium hydroxide or the like so that $NH^{30}{}_4$ is available as a counter cation for particles having a negative surface charge. If surface treatment of the colloidal inorganic oxide particles is desired, a suitable surface treatment agent can be blended into the sol, e.g., as described in Kang et al. '833, the disclosure of which is incorporated by reference herein. The free-radically curable binder precursor is then added to the ceramer composition. The ceramer composition is stripped to remove substantially all of the water. For example, removing about 98% of the water, thus leaving about 2% water in the ceramer composition, has been found to be suitable. As soon as substantially all of the water is removed, an organic solvent of the type described in Kang et al. '798 is typically added in an amount such that the ceramer composition includes from about 5% to about 99% by weight solids (about 10 to about 70%).

The ceramer composition is coated at a coating weight sufficient to provide a cured hardcoat with a thickness of about 1 to about 100 micrometers, about 2 to about 50 micrometers, or about 3 to about 30 micrometers. After coating, the solvent, if any, is flashed off with heat, vacuum, and/or the like. The coated ceramer composition is then cured by irradiation with a suitable form of energy, such as heat energy, visible light, ultraviolet light or electron beam radiation. Irradiating with ultraviolet light in ambient conditions is often utilized due to the relative low cost and high speed of this curing technique. In addition, the hardcoat surface optionally is roughened or textured to provide a matte surface. This can be accomplished in a variety of ways that will be familiar to those skilled in the art, including embossing the hardcoat with a suitable tool that has been bead-blasted or otherwise roughened, by adding a suitable small particle filler such as silica sand or glass beads to the hardcoat, or by carrying out cure against a suitable roughened master as described in U.S. Pat. No. 5,175,030 (Lu et al.) and U.S. Pat. No. 5,183,597 (Lu).

The coating composition, reaction product thereof (i.e. cured coating composition) as well as the protective articles of the inventions can be used on a variety of display and protective articles wherein a combination of low surface energy (e.g. anti-soiling, stain resistance, oil and/or water repellency) and durability (e.g. abrasion resistance) is desired while also maintaining optical clarity.

Various illuminated and non-illuminated display panels are known. Such displays include multi-character and especially multi-character, multi-line displays such as liquid crystal displays ("LCDs"), plasma displays, front and rear projection displays, cathode ray tubes ("CRTs"), signage, as well as single-character or binary displays such as light emitting diodes ("LEDs"), signal lamps and switches. The light transmissive (i.e. exposed) substrate of such display panels may be referred to as a "lens". The invention is particularly useful for displays having a viewing surface that is susceptible to damage during normal use.

The coating composition, reaction product thereof (i.e. dried and cured coating composition) as well as the protective articles of the invention can be employed in a variety of portable and non-portable information display devices including PDAs, cell phones (including combination PDA/cell phones), touch-sensitive screens, wrist watches, car navigation systems, global positioning systems, depth finders, calculators, electronic books, CD or DVD players, projection television screens, computer monitors, notebook computer displays, instrument gauges, instrument panel covers, signage such as graphic displays (including indoor and outdoor graphics, and the like), and the like. These devices can have planar viewing faces, or non-planar viewing faces such as the slightly curved face of a typical CRT. Typically the display element is located on or in close physical proximity to a viewing face of the information display device rather than being spaced an appreciable distance therefrom.

The coating composition, reaction product, and protective article can be employed on a variety of other articles as well such as for example camera lenses, eyeglass lenses, binocular lenses, retroreflective sheeting, automobile windows, building windows, train windows, boat windows, aircraft windows, vehicle headlamps and taillights, display cases, eyeglasses, watercraft hulls, road pavement markings, overhead projectors, stereo cabinet doors, stereo covers, furniture, bus station plastic, watch covers, as well as optical and magneto-optical recording disks, and the like.

Objects and advantages of this invention are further illustrated by the following examples, but the particular materials and amounts thereof recited in these examples, as well as other conditions and details, should not be construed to unduly limit this invention.

EXAMPLES

Test Methods

1. Contact Angle—The coatings were rinsed for 1 minute by hand agitation in IPA before being subjected to measurement of water and hexadecane contact angles. Measurements were made using as-received reagent-grade hexadecane (Aldrich) and deionized water filtered through a filtration system obtained from Millipore Corporation (Billerica, Mass.), on a video contact angle analyzer available as product number VCA-2500XE from AST Products (Billerica, Mass.). Reported values are the averages of measurements on at least three drops measured on the right and the left sides of the drops, and are shown in Table 2. Drop volumes were 5 μL for static measurements and 1–3 μL for advancing and receding. For hexadecane, only advancing and receding contact angles are reported because static and advancing values were found to be nearly equal.

2. Durability Test—The abrasion resistance of the cured films was tested cross-web to the coating direction by use of a mechanical device capable of oscillating cheesecloth or steel wool fastened to a stylus (by means of a rubber gasket) across the film's surface. The stylus oscillated over a 10 cm wide sweep width at a rate of 3.5 wipes/second wherein a "wipe" is defined as a single travel of 10 cm. The stylus had a flat, cylindrical geometry with a diameter of 1.25 inch (3.2 cm) for cheesecloth and a diameter of 6 mm for steel wool. The device was equipped with a platform on which weights were placed to increase the force exerted by the stylus normal to the film's surface. The cheesecloth was obtained from Summers Optical, EMS Packaging, A subdivision of EMS Acquisition Corp., Hatsfield, Pa. under the trade designation "Mil Spec CCC-c-440 Product # S12905". The cheesecloth was folded into 12 layers. The steel wool was obtained from Rhodes-American a division of Homax Products, Bellingham, Wash. under the trade designation "#0000-Super-Fine" and was used as received. A single sample was tested for each example, with the weight in grams applied to the stylus and the number of wipes employed during testing reported in Tables 3 and 4.

3. Bead-Up—An ink marking was applied to the surface layer with a pen commercially available under the trade designation "Sanford Sharpie, Fine Point permanent marker, no 30001". Observations were made to determine whether the ink mark beaded up when applied to the surface (i.e. "yes" per Table 3 and 4) or did not bead up (i.e. "no" per Table 3 and 4).

4. Ink Repellency—An ink marking was applied to the surface layer with a pen commercially available under the trade designation "Sanford Sharpie, Fine Point permanent marker, no 30001". Observations were made to determine whether the ink mark was easily removed by wiping with a dry tissue such as commercially available from Kimberly Clark Corporation, Roswell, Ga. under the trade designation "SURPASS FACIAL TISUUE". (i.e. "yes" per Table 3 and 4) or did not bead up (i.e. "no" per Table 3 and 4).

5. Haze and Transmission values of the coated films were measured by use of BYK Gardner Haze-Clarity-Transmission meter. The values are reported as percent.

Ingredients $F(CF(CF_3)CF_2O)aCF(CF_3)COOCH_3$ wherein a averages about 6.3, with an average molecular weight of 1.211 g/mol, and which can be prepared according to the method reported in U.S. Pat. No. 3,250,808 (Moore et al.), the disclosure of which is incorporated herein by reference, with purification by fractional distillation.

Trimethylolpropane triacrylate ("TMPTA") was obtained from Sartomer Company, Exton, Pa. under the trade designation "SR351" (AC-1)

A mixture of pentaerythritol tri- and tetra-acrylate was obtained from Sartomer Company under the trade designation "SR295". (AC-2)

Triethyleneglycol diacrylate was obtained from Sartomer Company under the trade designation "SR306". (AC-3)

ω-hydro 2,2,3,3,4,4,5,5-octafluoropentyl acrylate (H—$C_4F_8$—$CH_2O$—C(O)—CH=$CH_2$) was obtained from Oakwood Products, West Columbia, S.C. (FC-6)

N-methyl-1,3-propane-diamine, 2-amino-2-ethyl-1,3-propane diol and 2-amino-1,3-propane diol were obtained from Sigma-Aldrich, Milwaukee, Wis.

Acryloyl chloride was obtained from Sigma-Aldrich.

The UV photoinitiator used was obtained from Ciba Specialty Products, Terrytown, N.Y. under the trade designation "Darocur 1173".

1. Preparation of HFPOC(O)—NH—$CH_2CH_2$—OH Starting Material (i.e. HFPO-AE-OH)

HFPO—C(O)$OCH_3$ (Mw=1211 g/mole, 50.0 g) was placed in 200 ml round bottom flask. The flask was purged with nitrogen and placed in a water bath to maintain a temperature of 50° C. or less. To this flask was added 3.0 g (0.045 mol) of 2-aminoethanol (obtained from Aldrich). The reaction mixture was stirred for about 1 hr, after which time an infrared spectrum of the reaction mixture showed complete loss of the methyl ester band at 1790 $cm^{-1}$ and the presence of the strong amide carbonyl stretch at 1710 $cm^{-1}$. Methyl t-butyl ether (MTBE, 200 ml) was added to the reaction mixture and the organic phase was extracted twice with water/HCl (~5%) to remove unreacted amine and methanol. The MTBE layer was dried with $MgSO_4$. The MTBE was removed under reduced pressure to yield a clear, viscous liquid. $^1$H Nuclear magnetic resonance spectroscopy (NMR) and infrared spectroscopy (IR) confirmed the formation of the above-identified compound.

Preparation of Monofunctional Perfluoropolyether Acrylate (FC-1) HFPO—C(O)N(H)CH2CH2OC(O)CH=CH2 (HFPO-AEA)

HFPO-AE-OH (600 g) was combined with ethyl acetate (600 g) and triethylamine (57.9 g) in a 3-neck round bottom flask that was fitted with a mechanical stirrer, a reflux condenser, addition funnel, and a hose adapter that was connected to a source of nitrogen gas. The mixture was stirred under a nitrogen atmosphere and was heated to 40° C. Acryloyl chloride (51.75 g) was added dropwise to the flask from the addition funnel over about 30 minutes. The mixture was stirred at 40° C. overnight. The mixture was then allowed to cool to room temperature, diluted with 300 mL of 2N aqueous HCl and transferred to a separatory funnel. The aqueous layer was removed and the ethyl acetate layer was extracted with another 300 ml portion of 2N HCl. The organic phase was then extracted once with 5 wt-% aqueous NaHCO$_3$ separated, dried over MgSO$_4$ and filtered. Removal of the volatile components using a rotary evaporator resulted in 596 g of product (93% yield). $^1$H NMR and IR spectroscopy confirmed the formation of the above-identified compound.

2. Preparation of HFPOC(O)—NH—CH$_2$CH$_2$—O—CH$_2$CH$_2$—OH Starting Material (i.e. HFPO-AEE-OH)

HFPO—C(O)OCH$_3$ (Mw=1211 g/mole. 51.0 g) was placed in a 200 ml round bottom flask. The flask was purged with nitrogen and placed in a water bath to maintain a temperature of 50° C. or less. To this flask was added 5.35 g (0.045 mol) of 2-aminoethoxy ethanol (obtained from Aldrich). The reaction mixture was stirred for about 1 hr, after which time an infrared spectrum of the reaction mixture showed complete loss of the methyl ester band at 1790 cm$^{-1}$ and the presence of the strong amide carbonyl stretch at 1710 cm$^{-1}$. Methyl t-butyl ether (200 ml) was added to the reaction mixture and the organic phase was extracted twice with water/HCl (~15%) to remove unreacted amine and methanol. The MTBE layers were combined and dried with MgSO$_4$. The MTBE was removed under reduced pressure to yield a clear, viscous liquid. Further drying at 0.1 mm Hg at room temperature for 16 hrs, resulted in 48 g (90% yield). $^1$H NMR and IR spectroscopy confirmed the formation of the above-identified compound.

Preparation of Monofunctional Perfluoropolyether Acrylate (FC-2) HFPO—C(O)N(H)CH$_2$CH$_2$OCH$_2$CH$_2$OC(O)CH=CH$_2$ HFPO-AEE-OH (25 g) was combined with ethyl acetate (200 g) and triethylamine (5 g) in a 3-neck round bottom flask that was fitted with a mechanical stirrer, a reflux condenser, addition funnel, and a hose adapter that was connected to a source of nitrogen gas. The mixture was stirred under a nitrogen atmosphere and was heated to 40° C. Acryloyl chloride (5.5 g ) was added drop wise to the flask from the addition funnel over about 30 minutes. The mixture was stirred at 40° C. overnight. The mixture was then allowed to cool to room temperature, diluted with 300 mL of 2N aqueous HCl and transferred to a separatory funnel. The aqueous layer was removed and the ethyl acetate layer was extracted with another 300 ml portion of 2N HCl. The organic phase was then extracted once with 5 wt-% aqueous NaHCO$_3$ separated, dried over MgSO$_4$ and filtered. Removal of the volatile components using a rotary evaporator afforded the product. $^1$H NMR and IR spectroscopy confirmed the formation of the above-identified compound.

3. Preparation of Perfluoropolyether Amide-amine Starting Material HFPO—C(O)N(H)CH$_2$CH$_2$CH$_2$N(H)CH$_3$ To a 1 liter round bottom was charged 291.24 g (0.2405 moles) of the HFPO—C(O)OCH$_3$ (i.e. Mw 1211 g/mole) and 21.2 g (0.2405 moles) of N-methyl-1,3 propanediamine, both at room temperature, to form a cloudy solution. The flask was swirled and the solution temperature rose to 45° C., clearing to a water white liquid that was heated overnight at 55° C. The solution was then placed on a rotary evaporator at 75° C. and 28 inches Hg of vacuum to remove the methanol and yielded 301.88 g (99%) of a slightly yellow, viscous liquid, which was characterized by NMR methods to be the above-identified compound at 98% purity.

Preparation of Polyfunctional Perfluoropolyether Acrylate (FC-3) Michael addition adduct of HFPO—C(O)N(H)CH$_2$CH$_2$CH$_2$N(H)CH$_3$ with TMPTA in a 1:1 molar ratio A 250 mL round bottom was charged with 4.48 g (15.2 mmoles, based on a nominal MW of 294) of TMPTA, 4.45 g of tetrahydrofuran (THF), and 1.6 mg of phenothiazine (obtained from Sigma-Aldrich) and placed in an oil bath at 55° C. Next, in a 100 mL jar was dissolved 20 g (15.78 mmole, Mw 1267.15) HFPO—C(O)N(H)CH$_2$CH$_2$CH$_2$N(H)CH$_3$ in 32 g THF. This solution was placed in a 60 mL dropping funnel with pressure equalizing sidearm, the jar rinsed with ~3 mL of THF which was also added to the dropping funnel, and the contents of the funnel were added over 38 min, under an air atmosphere to the TMPTA/THF/phenothiazine mixture. The reaction was cloudy at first, but cleared at about 30 min. Twenty minutes after the addition was complete, the reaction flask was placed on a rotary evaporator at 45–55° C. under 28 inches of vacuum to yield 24.38 g of a clear, viscous yellow liquid that was characterized by NMR and HPLC/mass spectroscopy as the above-identified compound.

4. Preparation of HFPO—C(O)N(H)C(CH$_2$OH)$_2$CH$_2$CH$_3$ Starting Material

To a 500 ml 3 necked flask equipped with stir bar, reflux condenser, and heating bath was charged 11.91 g (0.1 mol) H$_2$NC(CH$_2$OH)$_2$CH$_2$CH$_3$ (obtained from Sigma-Aldrich) and 60 g THF. Next via dropping funnel was added 121.1 g (0.1 mol) HFPO—C(O)OCH$_3$ over about 80 min at a heating bath temperature of about 85° C. The reaction was cloudy at first, but became clear about 1 h into the reaction. After addition was

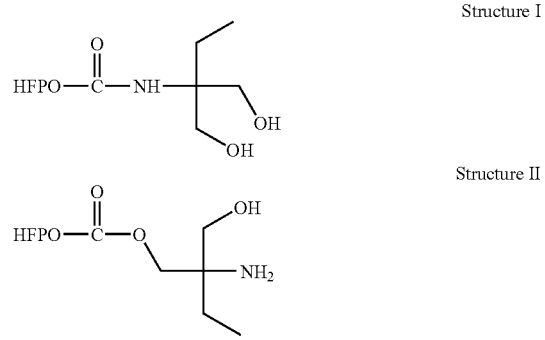

Structure I

Structure II complete, the heating bath was shut off and the reaction was allowed to cool for three days. The material was concentrated at 55° C. under aspirator vacuum to yield 130.03 g of a light colored syrup. NMR analysis showed the product to be an 87:13 mixture of the structures I to II as follows:

Preparation of Polyfunctional Perfluoropolyether Acrylate HFPO—C(O)N(H)C(CH$_2$OC(O)CH=CH$_2$)$_2$CH$_2$CH$_3$ (FC-4)

To a 250 ml 3 necked round bottom equipped with overhead stirrer was charged 65g (0.05 mol) of HFPO—C(O)N(H)C(CH$_2$OH)$_2$CH$_2$CH$_3$, the product mixture generated above, 12.65 g (0.125 mol) triethylamine and 65 g ethyl acetate. To the flask at room temperature was added 11.31 g (0.125 mol) acryloyl chloride using a pressure-equalizing dropping funnel over 12 min, with the reaction temperature rising from 25 to a maximum of 40° C. The funnel was rinsed with 5 g additional ethyl acetate and the rinse was added to the reaction that was then placed in a 40° C. bath and allowed to react for 2 hours and 10 min Structure III

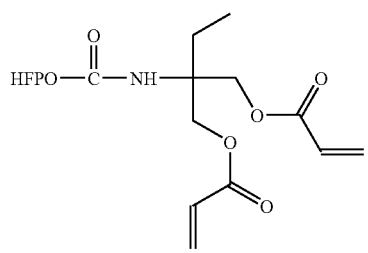

Structure IV

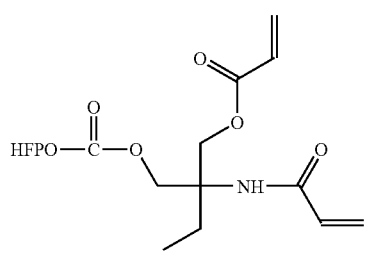

additional time. The organic layer was then successively washed with 65 g 2% aqueous sulfuric acid, 65 g 2% aqueous sodium bicarbonate, and 65 g water, dried over anhydrous magnesium sulfate, filtered, treated with 16 mg methoxyhydroquinone (MEHQ), and concentrated on a rotary evaporator at 45° C. to yield 62.8 g of crude product. Next 35 g of this material was chromatographed on 600 ml of silica gel (SX0143U-3, Grade 62, 60–200 mesh, EM Science) using 25:75 ethyl acetate: heptane as an eluent. The first two fractions were 250 ml in volume, the remaining fractions were 125 ml in volume. Fractions 4–10 were combined, 8 mg MEHQ was added to the fractions, which were concentrated on a rotary evaporator at 55° C. to provide 25.36 g of product that was analyzed by NMR, and found to be an 88:12 mixture of the structures III to IV.

5. Preparation of HFPO—C(O)N(H)C(CH$_2$OH)$_2$H Starting Material

By a method similar to the preparation of HFPO—C(O)N(H)C(CH$_2$OH)$_2$CH$_2$CH$_3$, 106.74 g (0.088 mol) HFPO—C(O)CH$_3$ was reacted with 8.03 g (0.088 mol) 2-amino-1,3-propanediol in 51 g THF to provide a product that was 93:7 amide diol:ester amino-alcohol.

Preparation of Polyfunctional Perfluoropolyether Acrylate (FC-5) HFPO—C(O)N(H)C(CH$_2$OC(O)CH=CH$_2$)$_2$H In a method similar to the preparation of HFPO—C(O)N(H)C(CH$_2$OC(O)CH=CH$_2$)$_2$CH$_2$CH$_3$, 50 g (0.3936 mol) HFPO—C(O)N(H)C(CH$_2$OH)$_2$H was reacted with 8.55 g (0.0945 mol) acryloyl chloride and 9.56 g (0.946 mol) triethylamine in 100 g of ethyl acetate, to provide after workup and chromatography, the 93:7 mixture of diacrylate and acrylamide-acrylate.

Preparation of the Coating Solutions:

Substrates were coated with the polymerizable compositions using materials and amounts by weight as reported in Table 1A and 1B. All polymerizable components were diluted to 10 percent by weight total solids in methyl ethyl ketone. Two weight percent based on solids of the photoinitiator Darocur 1173 was included in the polymerizable compositions using a 10 percent solids photoinitiator solution in methyl ethyl ketone. The photoinitiator was added before dilution of the mixture to the final concentration of the coating solution. Dilution to the solids concentration (i.e. 2 wt-% or 2.5 wt-%) was achieved using methyl isobutyl ketone. The final solids concentration of the coating solution for each Example is set forth in Tables 1A and 1B.

Coating, Drying, Curing Process

Two different substrates, each having a hardcoat surface layer were used in the Examples. The first substrate (S-1) was prepared from a transparent polyethylene terephthalate (PET) film obtained from e.i. DuPont de Nemours and Company, Wilmington, DE under the trade designation "Melinex 618" having a thickness of 5.0 mils and a primed surface. A hardcoat composition that was substantially the same as Example 3 of U.S. Pat. No. 6,299,799 was coated onto the primed surface and cured in a UV chamber having less than 50 parts per million (ppm) oxygen. The UV chamber was equipped with a 600 watt H-type bulb from Fusion UV systems, Gaithersburg Md., operating at full power. The second substrate (S-2) was a matte film having a preapplied hardcoat surface layer commercially available from U.S.A. Kimoto Tech, Cedartown, Ga. under the trade designation "N4D2A" (S-2). The matte film was used without further modification.

The hardcoat was applied to the Melinex 618 film with a metered, precision die coating process. The hardcoat was diluted in IPA to 30 wt-% solids and coated onto the 5-mil PET backing to achieve a dry thickness of 5 microns. A flow meter was used to monitor and set the flow rate of the material from a pressurized container. The flow rate was adjusted by changing the air pressure inside the sealed container which forces liquid out through a tube, through a filter, the flow meter and then through the die. The dried and cured film was wound on a take up roll and used as the input backing for the coating solutions described below.

The hardcoat coating and drying parameters for S-1 were as follows:
Coating width: 6" (15 cm)
Web Speed: 30 feet (9.1 m) per minute
Solution % Solids: 30.2%
Filter: 2.5 micron absolute
Pressure Pot: 1.5 gallon capacity (5.7 l)
Flow rate: 35 g/min
Wet Coating Thickness: 24.9 microns
Dry Coating Thickness: 4.9 microns
Conventional Oven Temps: 140° F. (60° C.) Zone 1
160° F. (53° C.) Zone 2
180° F. (82° C.) Zone 3
Length of oven 10 feet (3 m)

The coating compositions of the invention were coated onto the hardcoat layer of either S-1 or S-2 using a precision, metered die coater. For this step, a syringe pump was used to meter the solution into the die. The solutions were diluted to a concentration of 2% or 2.5% solids as indicated in Table I and coated onto the hardcoat layer to achieve a dry thickness of 40–60 nm. The material was dried in a conventional air flotation oven and then sent through the UV chamber having less than 50 ppm oxygen. The UV chamber was equipped with a 600 watt H-type bulb from Fusion UV systems, Gaithersburg Md., operating at full power.

The surface layer coating and drying parameters were as follows:

Coating width: 4″ (10 cm)
Web Speed: 10 feet per minute
Solution % Solids: 2.0%
Pump: 60 cc Syringe Pump
Flow rate: 1.2 cc/min
Wet Coating Thickness: 4.1 microns
Dry Coating Thickness: 60 nm
Conventional Oven Temps: 65° C. Zone 1
  65° C. Zone 2
Length of oven 10 feet (3 m)

TABLE 1A

Coating Formulations (wt-% solids)

| Example | Coating Solution Wt-% Solids | AC-1 | FC-1 | FC-3 | FC-6 | Substrate |
|---|---|---|---|---|---|---|
| 1a | 2 | 90 | 2 | | 8 | S-1 |
| 1b | 2 | 90 | 2 | | 8 | S-2 |
| 2a | 2 | 85 | 5 | | 10 | S-1 |
| 2b | 2 | 85 | 5 | | 10 | S-2 |
| 3a | 2.5 | 85 | | 10 | 5 | S-1 |
| 3b | 2.5 | 85 | | 10 | 5 | S-2 |
| 4a | 2.5 | 85 | | 10 | 5 | S-1 |
| 4b | 2.5 | 85 | | 10 | 5 | S-2 |
| 5a | 2.5 | 85 | 5 | 10 | | S-1 |
| 5b | 2.5 | 85 | 5 | 10 | | S-2 |
| 6a | 2.5 | 85 | | | 15 | S-1 |
| 6b | 2.5 | 85 | | | 15 | S-2 |
| 7a | 2.5 | 85 | 5 | 5 | 5 | S-1 |
| 7b | 2.5 | 85 | 5 | 5 | 5 | S-2 |
| 8a | 2.5 | 90 | | 10 | | S-1 |
| 8b | 2.5 | 90 | | 10 | | S-2 |
| 9a | 2.5 | 95 | 5 | | | S-1 |
| 9b | 2.5 | 95 | 5 | | | S-2 |
| 10b | 2 | 20 | 70 | 10 | | S-2 |
| 11b | 2 | 20 | 10 | 70 | | S-2 |
| 12a | 2 | 95 | | 5 | | S-1 |
| 12b | 2 | 95 | | 5 | | S-2 |
| 13a | 2 | 97.5 | | 2.5 | | S-1 |
| 13b | 2 | 97.5 | | 2.5 | | S-2 |
| 14a | 2 | 98.75 | | 1.25 | | S-1 |
| 14b | 2 | 98.75 | | 1.25 | | S-2 |
| 15a | 2 | 99.375 | | 0.625 | | S-1 |
| 15b | 2 | 99.375 | | 0.625 | | S-2 |

TABLE 1B

Coating Formulations (wt-% solids)

| Example | Coating Solution Wt-% Solids | AC-1 | FC-1 | FC-2 | FC-5 | FC-4 | Substrate |
|---|---|---|---|---|---|---|---|
| 16a | 2.5 | 95 | | | | 5 | S-1 |
| 16b | 2.5 | 95 | | | | 5 | S-2 |
| 17b | 2 | 20 | 70 | | | 10 | S-2 |
| 18b | 2 | 20 | 10 | | | 70 | S-2 |
| 19a | 2.5 | 95 | | | 5 | | S-1 |
| 19b | 2.5 | 95 | | | 5 | | S-2 |
| 20a | 2 | 85 | | 5 | 10 FC-6 (instead of FC-5) | | |
| 21b | 2 | 95 AC-2 (instead of AC-1) | | 5 | | | |
| 22b | 2 | 95 AC-3 (instead of AC-1) | | 5 | | | |
| Comp A | 2.5 | 100 | | | | | S-1 |
| Comp B | 2.5 | 100 | | | | | S-2 |

TABLE 2

Contact Angle Testing

| Example | Water Contact Angle (degrees) | | | Hexadecane Contact Angle | | Haze before testing | Trans before testing |
|---|---|---|---|---|---|---|---|
| | Static | Advancing | Receding | Advancing | Receding | | |
| 1a | 98 | 108 | 76 | 51 | 39 | 0.22 | 93.1 |
| 2a | 106 | 119 | 92 | 63 | 55 | 0.53 | 92.5 |
| 3a | 104 | 109 | 61 | 69 | 58 | 0.59 | 93 |
| 3b* | 105 | 115 | 76 | 66 | 54 | NM | NM |
| 4a | 102 | 115 | 74 | 63 | 53 | 0.69 | 96 |
| 5a* | 108 | 119 | 87 | 69 | 62 | | |
| 5b** | 109 | 121 | 88 | 69 | 60 | NM | NM |
| 6a* | 104 | 115 | 76 | 66 | 56 | | |
| 6b* | 106 | 119 | 80 | 67 | 57 | NM | NM |
| 7a | 107 | 119 | 86 | 67 | 58 | 0.55 | 99.6 |
| 8a | 103 | 115 | 75 | 64 | 54 | 0.94 | 99.4 |
| 9a | 104 | 115 | 88 | 60 | 51 | 0.56 | 99.6 |
| 10b | 110 | 123 | 91 | 72 | 62 | NM | NM |
| 11b | 110 | 119 | 75 | 71 | 61 | NM | NM |
| 12a | 81 | 96 | 43 | 51 | 34 | 1.31 | 93.6 |
| 13a | 77 | 92 | 41 | 42 | 28 | 1.02 | 94.1 |
| 14a | 67 | 83 | 36 | 33 | NM | 1.03 | 94.8 |
| 15a | 64 | 80 | 33 | 29 | NM | 1.07 | 94.9 |
| 16a | 108 | 118 | 97 | 65 | 59 | 0.54 | 99.6 |
| 17b | 110 | 123 | 89 | 70 | 60 | NM | NM |
| 18b | 110 | 123 | 89 | 69 | 59 | NM | NM |
| 19a | 106 | 119 | 96 | 65 | 57 | 0.46 | 99.6 |
| 20 | 105 | 118 | 91 | 63 | 54 | 0.28 | 93.2 |
| 21b | 101 | 114 | 82 | 61 | 50 | NM | NM |
| 22b | 106 | 119 | 76 | 63 | 55 | NM | NM |
| Comp A | 59 | 76 | 47 | 18 | NM | 0.60 | 99.5 |

*40 nm thickness
**50 nm thickness
NM—not measured

TABLE 3

Cheesecloth Durability Test Results

| Example | Weight (g) Applied to Stylus | No. of Wipes | Initial | | After Durability Testing | |
|---|---|---|---|---|---|---|
| | | | Ink repellency Yes/No | Ink Beads Up Yes/No | Ink repellency Yes/No | Ink Beads Up Yes/No |
| 4b | 725 | 200 | Y | Y | Y | Y |
| 7b | 725 | 200 | Y | Y | Y | Y |
| 8b | 725 | 200 | Y | Y | Y | Y |
| 9b | 725 | 200 | Y | Y | Y | Y |

TABLE 3-continued

Cheesecloth Durability Test Results

| Example | Weight (g) Applied to Stylus | No. of Wipes | Initial Ink repellency Yes/No | Initial Ink Beads Up Yes/No | After Durability Testing Ink repellency Yes/No | After Durability Testing Ink Beads Up Yes/No |
|---|---|---|---|---|---|---|
| 12b | 1000 | 500 | Y | Y | Y | Y |
| 13b | 1000 | 500 | Y | Y | Y | Y |
| 14b | 1000 | 100 | Y | Y | Y | Y |
| 15b | 1000 | 500 | N | N | N | N |
| 16 | 725 | 200 | Y | Y | Y | Y |
| 19 | 725 | 200 | Y | Y | Y | Y |
| Comp B | 725 | 200 | N | N | N | N |

TABLE 4

Steel Wool Durability Test Results

| Example | No. of Wipes | Initial Ink repellency Yes/No | Initial Ink Beads Up Yes/No | After Durability Testing Ink repellency Yes/No | After Durability Testing Ink Beads Up Yes/No |
|---|---|---|---|---|---|
| 2a | 500 | Y | Y | Y | Y |
| 2b | 100 | Y | Y | Y | Y |
| 4a | 500 | Y | Y | Y | Y |
| 7a | 50 | Y | Y | Y | Y |
| 8a | 100 | Y | Y | Y | Y |
| 9a | 500 | Y | Y | Y | Y |
| 16a | 500 | Y | Y | Y | Y |
| 19a | 500 | Y | Y | Y | Y |
| 20a | 500 | Y | Y | Y | Y |

200 g weight for all steel wool durability testing

What is claimed is:

1. An article comprising:
   a) a light transmissive substrate having a surface layer comprising the reaction product of
      i) at least one fluoropolyether (meth)acryl compound the fluoropolyether (meth)acryl compound comprising at least one terminal $F(CF(CF_3)CF_2O)aCF(CF_3)$— group and at least two (meth)acryl groups wherein a averages from 4 to 15, and
      ii) at least 50 wt-% of non-fluorinated crosslinking agent(s); and
   b) a hardcoat layer disposed between the substrate and the surface layer wherein the hardcoat comprises inorganic particles dispersed in a binder comprising one or more free-radically polymerized monomers, oligomers, or polymers.

2. The article of claim 1 wherein the substrate is a transparent or matte polymeric film.

3. The article of claim 1 wherein the surface layer exhibits a static contact angle with water of at least 90°.

4. The article of claim 1 wherein the surface layer exhibits an advancing contact angle with hexadecane of at least 60°.

5. The article of claim 1 wherein the surface layer exhibits ink repellency after 200 wipes with cheesecloth and a weight of 725 grams according to the Durability Test.

6. The article of claim 1 wherein the surface layer exhibits ink bead up after 500 wipes with cheesecloth and a weight of 725 grams according to the Durability Test.

7. The article of claim 1 wherein the surface layer has a thickness ranging from about 10 to 200 nanometers.

8. The article of claim 7 wherein the surface layer exhibits an initial haze of less than 2%.

9. The article of claim 7 wherein the surface layer exhibits an initial transmission of at least 90%.

10. The article of claim 1 wherein the substrate has a major surface opposing the surface layer and an adhesive layer is disposed on the opposing major surface.

11. The article of claim 1 wherein the fluoropolyether (meth)acryl compound is monofunctional.

12. The article of claim 1 wherein the fluoropolyether (meth)acryl compound is polyfunctional.

13. The article of claim 1 wherein the fluoropolyether (meth)acryl compound is a mixture of at least one monofunctional compound and at least one polyfunctional compound.

14. The article of claim 1 wherein the surface comprises the reaction product of the at least one fluoropolyether (meth)acryl compound and at least 60 wt-% of one or more non-fluorinated crossliniking agents.

15. The article of claim 1 wherein the surface comprises the reaction product of the at least one fluoropolyether (meth)acryl compound and at least 80 wt-% of one or more non-fluorinated crossliniking agents.

16. The article of claim 1 wherein the surface layer is coated onto the hardcoat layer and the hardcoat layer has a thickness of 1 to 100 microns.

17. The article of claim 16 wherein the inorganic particles are acrylate functionalized.

18. A display panel comprising:
   a) a light transmissive substrate having a surface layer comprising the reaction product of
      i) at least one fluoropolyether (meth)acryl compound comprising at least one terminal $F(CF(CF_3)CF_2O)aCF(CF_3)$— group wherein a averages from 4 to 15, and at least two (meth)acryl groups, and
      ii) at least 50 wt-% of non-fluorinated crossliniking agent(s); and
   b) a hardcoat layer disposed between the substrate and the surface layer wherein the hardcoat comprises inorganic particles dispersed in a binder comprising one or more free-radically polymerized monomers, oligomers, or polymers.

19. The display panel of claim 18 wherein the article is selected from a touch screen, a liquid crystal display panel, a plasma display panel, a television screen, a computer screen, and an instrument display panel.

20. The display panel of claim 18 wherein the surface comprises the reaction product of the at least one fluoropolyether (meth)acryl compound and at least 60 wt-% of non-fluorinated crosslinking agent(s).

21. The display panel of claim 18 wherein the surface comprises the reaction product of the at least one fluoropolyether (meth)acryl compound and at least 80 wt-% of non-fluorinated crosslinking agent(s).

22. The display panel of claim 18 wherein the surface layer is coated onto the hardcoat layer and the hardcoat layer has a thickness of 1 to 100 microns.

23. The display panel of claim 22 wherein the inorganic particles are acrylate functionalized.

24. An article comprising a substrate having a surface layer comprising the reaction product of at least one fluoropolyether (meth)acryl compound comprising at least one terminal $F(CF(CF_3)CF_2O)aCF(CF_3)$— group wherein a averages from 4 to 15, and at least two (meth)acryl groups, and at least 50 wt-% of non-fluorinated crossliniking agent(s); and a hardcoat layer disposed between the substrate and the surface layer wherein the hardcoat comprises inorganic particles dispersed in a binder comprising one or more free-radically polymerized monomers, oligomers, or polymers.

25. The article of claim 24 wherein the surface comprises the reaction product of the at least one fluoropolyether (meth)acryl compound and at least 60 wt-% of non-fluorinated crosslinking agent(s).

26. The article of claim 24 wherein the surface comprises the reaction product of the at least one fluoropolyether (meth)acryl compound and at least 80 wt-% of non-fluorinated crossliniking agent(s).

27. The article of claim 24 wherein the surface layer is coated onto the hardcoat layer and the hardcoat layer has a thickness of 1 to 100 microns.

28. The article of claim 27 wherein the inorganic particles are acrylate functionalized.

* * * * *

UNITED STATES PATENT AND TRADEMARK OFFICE
CERTIFICATE OF CORRECTION

PATENT NO.        : 7,267,850 B2
APPLICATION NO.   : 11/458408
DATED             : September 11, 2007
INVENTOR(S)       : William D. Coggio et al.

It is certified that error appears in the above-identified patent and that said Letters Patent is hereby corrected as shown below:

Column 3
Line 67, After "durable" insert -- . --.

Column 6
Line 13, After "wt-%" insert -- . --.

Column 14
Line 12, Delete "$NH^{30}_4$" and insert -- $NH^+_4$ --, therefor.

Column 17
Line 5, Delete "HFPO–C(O)N(H)CH2CH2OC(O)CH=CH2" and
insert -- $HFPOC(O)N(H)CH_2CH_2OC(O)CH=CH_2$ --, therefor.

Column 20
Line 23, Delete "e.i." and insert -- i.e. --, therefor.

Column 23
Line 39, After "testing" insert -- . --.
Line 61, In Claim 4, delete "60°." and insert -- 50°. --, therefor.

Column 24
Line 21, In Claim 14, delete "crossliniking" and insert -- crosslinking --, therefor.
Line 25, In Claim 15, delete "crossliniking" and insert -- crosslinking --, therefor.
Line 39, In Claim 18, delete "crossliniking" and insert -- crosslinking --, therefor.

Column 25
Line 2, In Claim 24, delete "crossliniking" and insert -- crosslinking --, therefor.

UNITED STATES PATENT AND TRADEMARK OFFICE
CERTIFICATE OF CORRECTION

PATENT NO. : 7,267,850 B2
APPLICATION NO. : 11/458408
DATED : September 11, 2007
INVENTOR(S) : William D. Coggio et al.

It is certified that error appears in the above-identified patent and that said Letters Patent is hereby corrected as shown below:

Column 26
Line 4, In Claim 24, delete "crossliniking" and insert -- crosslinking --, therefor.

Signed and Sealed this

Twentieth Day of November, 2007

JON W. DUDAS
*Director of the United States Patent and Trademark Office*

UNITED STATES PATENT AND TRADEMARK OFFICE
CERTIFICATE OF CORRECTION

PATENT NO. : 7,267,850 B2  Page 1 of 1
APPLICATION NO. : 11/458408
DATED : September 11, 2007
INVENTOR(S) : William D. Coggio It is certified that error appears in the above-identified patent and that said Letters Patent is hereby corrected as shown below:

Cover Page
Under Section (75) Inventors in line 5, delete "Eisbernd" and insert therefore
-- Elsberd --.

Signed and Sealed this

Eighth Day of April, 2008

JON W. DUDAS
*Director of the United States Patent and Trademark Office*